United States Patent [19]

Bain

[11] 4,381,515

[45] Apr. 26, 1983

[54] REDUCTION OF PULSED DROPLET ARRAY CROSSTALK

[75] Inventor: Lee L. Bain, Arlington, Tex.

[73] Assignee: Xerox Corporation, Stamford, Conn.

[21] Appl. No.: 257,699

[22] Filed: Apr. 27, 1981

[51] Int. Cl.³ .............................................. G01D 15/18

[52] U.S. Cl. .................................. 346/140 R; 310/317

[58] Field of Search ............. 346/140 R, 75; 310/317, 310/319

[56] References Cited

U.S. PATENT DOCUMENTS

| | | | |
|---|---|---|---|
| 4,074,278 | 2/1978 | Robertson | 346/75 |
| 4,156,823 | 5/1979 | Suzuki | 310/317 |
| 4,158,847 | 6/1979 | Heinzl et al. | 346/140 R |
| 4,215,354 | 7/1980 | Larsson | 346/140 R |
| 4,216,483 | 8/1980 | Kyser et al. | 346/140 R |
| 4,243,995 | 1/1981 | Wright et al. | 346/140 R |
| 4,251,823 | 2/1981 | Sagae | 346/140 R |
| 4,282,535 | 8/1981 | Kern | 346/140 |

*Primary Examiner*—Joseph W. Hartary

*Attorney, Agent, or Firm*—Richard A. Tomlin

[57] ABSTRACT

A method for eliminating mechanical crosstalk in a drop-on-demand ink jet array by inducing electrical crosstalk using passive elements, which effectively neutralize the mechanical crosstalk.

8 Claims, 7 Drawing Figures

REDUCTION OF PULSED DROPLET ARRAY CROSSTALK

The invention relates in general to drop-on-demand or pulsed liquid droplet ejecting systems in which closely spaced arrays of droplet ejecting jets are used. Specifically, the invention relates to an electronic method for effectively neutralizing the mechanical "crosstalk" between jets in an array of jets.

In a pulsed liquid droplet ejecting system, such as an ink jet printer, transducers are used to cause expulsion of ink as droplets from a small nozzle or jet. An array of such jets is often utilized in high-speed, high-resolution printers. As is well known, the rate of printing and the resolution of the printed image depend on the number of such jets and their spacing. The closer the jets are to one another in general, the faster the images can be produced and with higher image resolution.

Typical of such arrays are those shown in U.S. Pat. Nos. 4,158,847, 4,216,483 and 4,243,995. These arrays, however, can suffer from a common problem, and that is that when the jets are very close to one another in an array, the response of one jet to its drive pulse can be affected by the simultaneous application of a drive pulse to another nearby jet. In a drop-on-demand printer this can seriously affect system operation since the jets are fired only as required. In a drop-on-demand system, a particular jet may be fired alone or together with an adjacent jet, both adjacent jets or several adjoining jets. When more than one jet in an array of jets is firing, there are two primary causes of array crosstalk interaction. First, there is the transmittal of pressure waves through the solid material in which the jets are formed; second, there is the transmittal of pressure waves through the common interconnecting liquid ink supply system. Two effects on drop velocity by such crosstalk are possible and occur. Either the concurrent activity of two or more closely spaced jets increases drop velocity, referred to hereafter as "positive" crosstalk; or the concurrent activity of two or more closely spaced jets decreases drop velocity, a characteristic referred to hereafter as "negative" crosstalk.

It has been discovered that the effects of both types of crosstalk can be reduced by the same technique, that is, by inducing electrical crosstalk, using passive electrical circuits, to cancel the mechanical crosstalk.

The advantages of the present invention will be better understood on consideration of the following description, particularly when taken in conjunction with the drawing, wherein.

Figure 1:
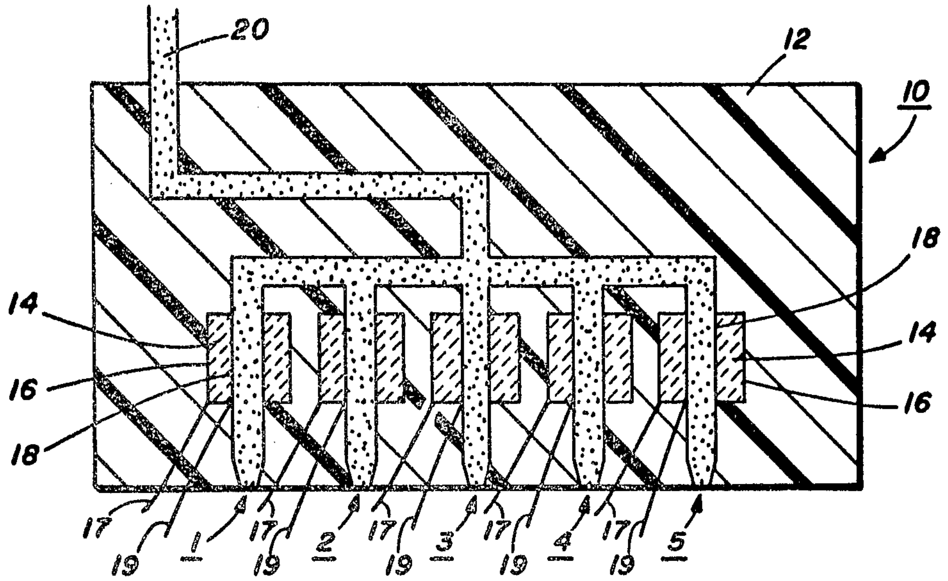
FIG. 1 is a top sectional view of a typical ink jet array.

Referring now to FIG. 1, there is shown an ink jet array designated generally as 10, which, in this exemplary instance, is made up of five droplet ejecting jets 1–5 in array body 12. The jets are circular channels surrounded by cylindrical piezoelectric transducers 14. Each transducer has two conductive surface electrodes 16, 18 connected to a source of electrical potential difference (not shown) by electrical leads 17 and 19. The jets 1–5 contain ink 20 supplied by a common ink supply (not shown). Such jets are commercially available and are shown, for example, in U.S. Pat. No. 4,158,847. When a potential difference, that is, a drive pulse, is applied between leads 17 and 19, the piezoelectric transducer 14 contracts squeezing the ink 20 in the jets 1–5, causing a droplet of ink to be ejected.

Figure 2:
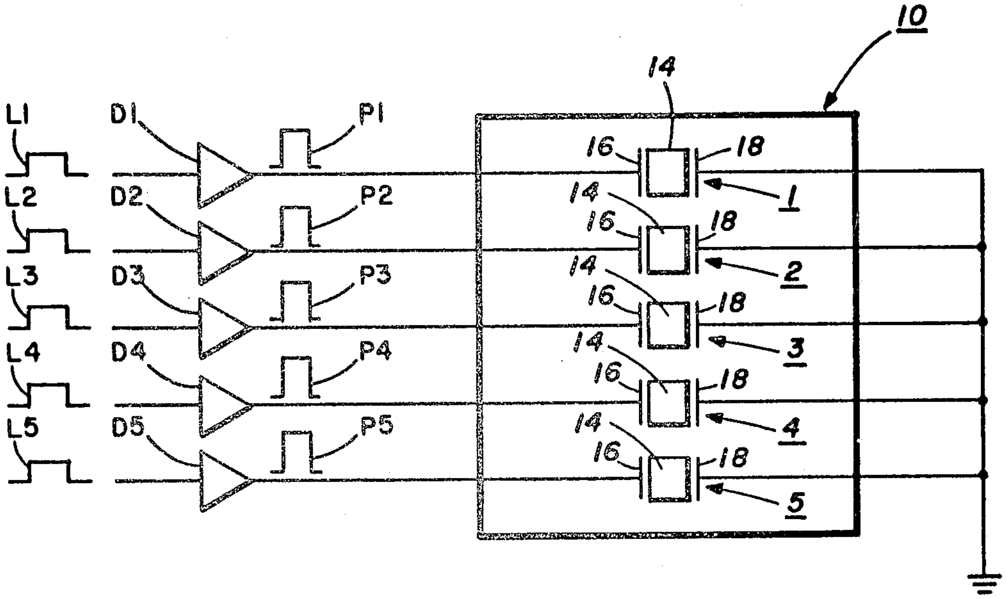
FIG. 2 PRIOR ART
FIG. 2 is an electrical schematic of a typical ink jet array and driver circuitry.

Referring now to FIG. 2, there is shown an electrical schematic for the jet array 10 and driving circuitry. The ink jet array is represented by box 10. The piezoelectric transducers 14 for ejectors 1–5 are represented by boxes 1–5, respectively, the sides of which represent transducer 14 conductive surface electrodes 16, 18. D1–D5 are pulse drivers that convert the logic level pulses L1–L5 to high-voltage drive pulses P1–P5.

In such drop-on-demand arrays, the effect of mechanical crosstalk is to modulate the energy going into drop ejection, therefore, the result is the same as though the modulation is due to electrical crosstalk in the driver circuitry. For a simplified electrical equivalent circuit, for the general case, the mechanical crosstalk may be viewed as a network of series/parallel impedances that provide signal leakage paths between neighboring channels. Since the mechanical leakage is energy (i.e., power), the impedances may be considered simple resistance.

Figure 3:
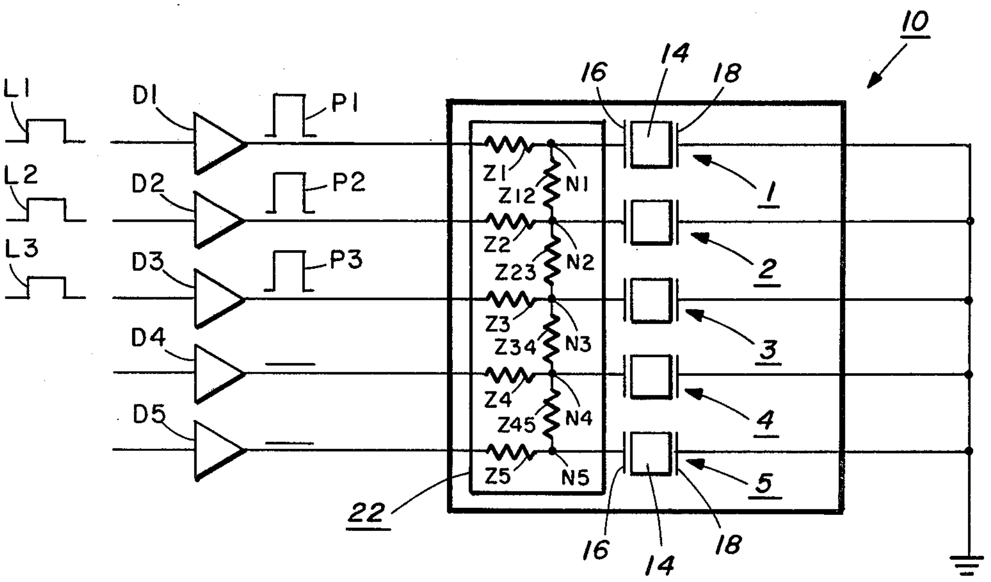
FIGS. 3 and 4 are schematics of electrical network equivalents of the two types (i.e., positive and negative) of mechanical crosstalk encountered in ink jet arrays.

Referring now to FIG. 3, there is shown an electrical schematic of an array and driver circuitry with the electrical equivalent of positive mechanical crosstalk represented by the network of impedances enclosed by box 22, virtually inserted into the active side of the array. The impedances Z1–Z5 represent normal small losses in the mechanical system. N1–N5 are the network nodes for array channels 1–5. The impedances Z12, Z23, Z34 and Z45 represent interchannel energy losses where the mechanical isolation between channels is not perfect. Mechanically, the positive effect of concurrent activity is the result of the crosstalk pressure pulses being in-phase so that they support each other; that is, the energy lost from a given channel is replaced by the energy gained from neighboring active channels and vice versa. Conversely, an inactive channel acts as an energy sink only, not providing energy to replace that lost by its active neighbors. Analysis of the electrical equivalent of this mechanical crosstalk shows that when neighboring drive pulses are applied concurrently, the potential at neighboring nodes is virtually equal so that very little current leaks across the parallel impedances, therefore the full potential of each drive pulse is felt across each piezoelectric transducer 14 to produce a given drop energy or velocity. Conversely, an inactive driver acts as a current sink; the cross-current flow reduces the pulse potential applied to neighboring piezoelectric transducers 14, thereby reducing their drop energy or velocity.

Specifically, referring to FIG. 3, consider the case where ejector 2 is operating alone. Driver D2 applies drive pulse P2 across electrodes 16 and 18 of piezoelectric transducer 14, which generates a pressure pulse in ink 20 causing a droplet to be ejected from channel 2.

Some of the pressure pulse energy is mechanically leaked and absorbed by inactive channels 1 and 3. Referring now to the electrical equivalent of this action, when P2 is applied alone, some of the current that would flow through Z2 into node N2 would be drained off through Z12 and Z23 into inactive nodes N1 and N3, causing a drop in pulse potential at N2 and across the piezoelectric transducer 14 of ejector 2. If ejector 1 is also activated so that P1 and P2 are concurrent, the mechanical pressure lost to channel 1 is replaced so that the velocity of the droplet from ejector 2 is increased slightly. Likewise, if ejector 3 is activated concurrent with 1 and 2, the energy lost to channel 3 is also replaced resulting in the velocity of the droplet ejected from ejector 2 being increased further. For the electrical equivalent, when P1 is applied concurrent with P2, the potential at N1 would be near that of N2, and little or no current would flow through Z12; therefore, the potential at N2 would increase slightly, causing a corresponding increase in the velocity of the drop ejected from channel 2. Likewise, if P3 is also applied concurrent with P2, little or no current would leak into N3 so that the potential at N2, hence the velocity of the drop from channel 2, would increase still more.

As stated, the positive effect of mechanical crosstalk in an ink jet array is attributed to the phase of interchannel interface being such that it is additive, thereby increasing drop velocity. Conversely, the negative effect of mechanical crosstalk is attributed to the phase being such that it subtracts, resulting in a decrease in drop velocity.

Figure 4:
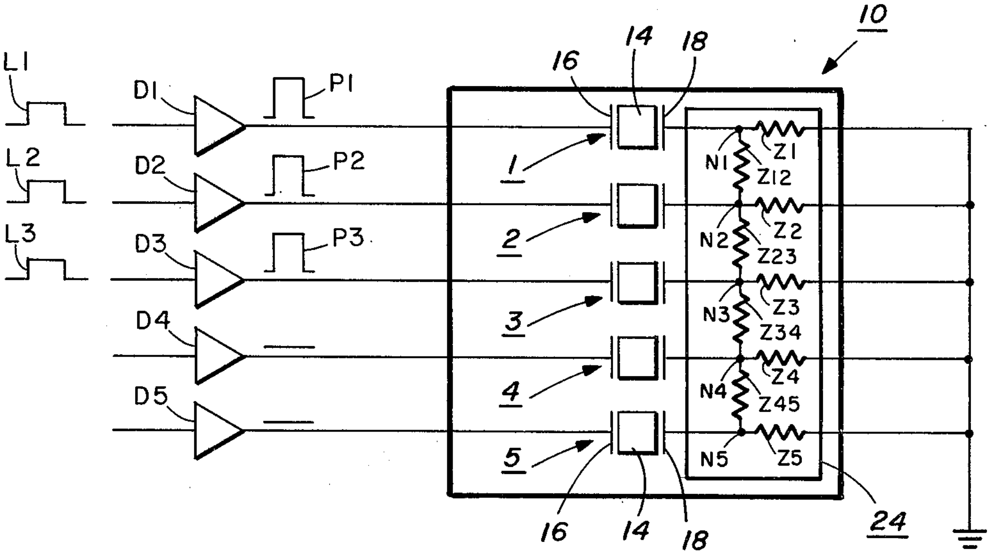

Referring now to FIG. 4, there is shown an electrical schematic of an array and driver circuitry with the electrical equivalent of negative mechanical crosstalk represented by the network of impedances enclosed by box 24, virtually inserted into the passive side of the array. The discussion for the positive crosstalk conversely holds true here; that is, when a given channel is activated singly, its drop velocity is greater than when its pressure pulse is reduced by out-of-phase energy from neighboring channels activated concurrently. Likewise, analysis of the electrical equivalent circuitry shows that, for a given channel activated singly, the potential difference of the drive pulse across the piezoelectric transducer 14 is greater than when it is reduced by the increased potential of its nodes N1–N5 in the virtue network due to current leaked from neighboring channels activated concurrently.

Although the above discussion of positive and negative crosstalk was limited to the interaction of ejector channels 1, 2 and 3; the same principles apply to all of the channels in the array. For the general case, the predominant interaction is between adjacent channels; however, for some array designs, a given channel may be affected, to a lesser degree, by interference from channels farther away.

For the typical imperfect array, it is possible and probable that both positive and negative crosstalk occur simultaneously, one cancelling the other to some degree, with the net response of the array being positive or negative if one is dominant. The performance of the imperfect array with mechanical crosstalk may be improved if a sufficient degree of real electrical crosstalk is purposely created such that the dominant inherent crosstalk is more nearly cancelled to yield a net crosstalk of near zero.

Figure 5:
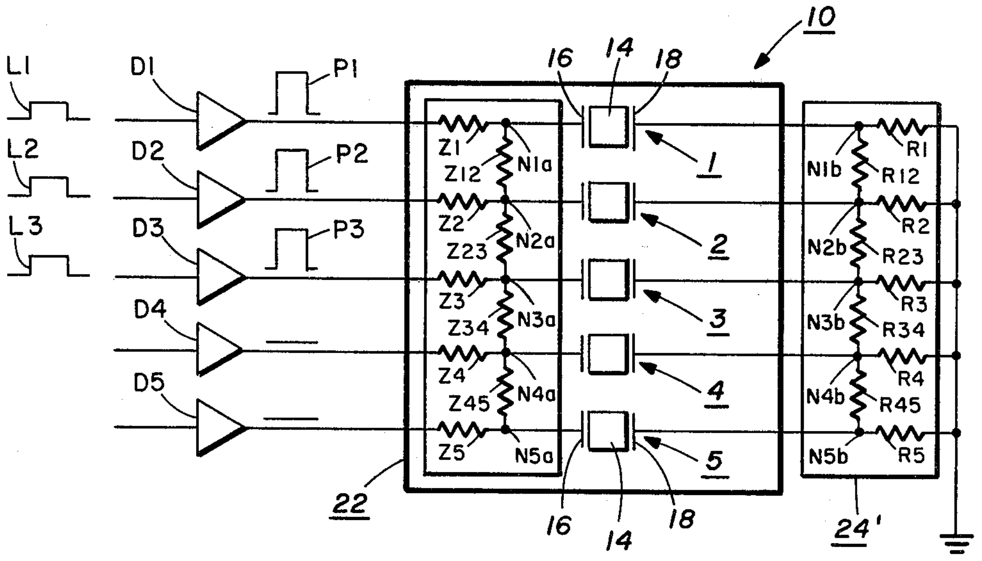
FIG. 5 is a schematic of an electrical network showing a circuit for minimizing positive mechanical crosstalk in an ink jet array.

Referring now to FIG. 5, there is shown an electrical schematic of an array 10 and driving circuitry with dominant positive mechanical crosstalk represented by a virtual network enclosed by box 22. Here, an analogous, but real, network box 24' is shown inserted into the passive side of the array drive circuitry such that real electrical negative crosstalk is generated to "common mode", the positive crosstalk in the active side of the array; that is, the effect of the inherent mechanical positive crosstalk is cancelled by the induced electrical negative crosstalk. The values for the parallel resistors R12, R23, R34 and R45 depend on how much negative cross-coupling is required to nullify the positive mechanical crosstalk. This is determined by comparing the velocity of droplets expelled when jets are fired singly and together and adjusting the resistor values until droplet velocity does not vary significantly whether the jets are fired singly or together. Specifically, considering again the operation of jet 2, assume that jets 1 and 2 are fired together. Because there is positive mechanical crosstalk, the energy leakage or pressure wave from jet 1 to jet 2 is additive to the pressure wave generated in jet 2 by its transducer resulting in increased energy being applied to the ink in the channel of jet 2, hence droplet velocity increases. However, by introducing circuitry such as shown in box 24' to the array 10 drive circuitry on the common side, the energy increase can be offset. Specifically, when both ejectors 1 and 2 are fired, the flow of current through R12 from node N1*b* to node N2*b* raises electrode 18 to a higher potential relative to electrode 16, thus reducing the potential difference applied to transducer 14. This reduced potential difference causes transducer 14 to constrict less, applying less pressure to the ink 20 in the channel of ejector 2, hence reducing the velocity of the expelled droplet.

Figure 6:
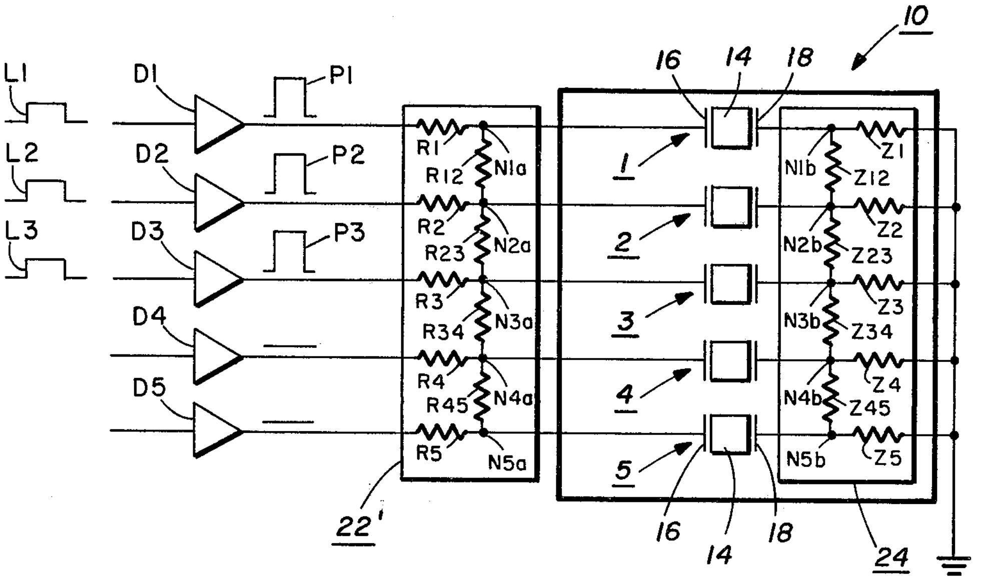
FIG. 6 is a schematic of an electrical network showing a circuit for minimizing negative mechanical crosstalk in an ink jet array.

Referring now to FIG. 6, there is shown an array 10 with predominantly negative crosstalk represented by the virtual circuitry of box 24. Here, when ejector 1 is fired, the decrease in channel 2 drop velocity is caused by mechanical pressure wave absorption represented by impedance Z12, which decreases the energy applied to the ink 20 in the channel of ejector 2. The effect is offset by providing a source of drive pulse current leakage through resistor R12 to increase the potential of electrode 16 relative to electrode 18. This increase in potential difference applied to the transducer 14 causes more constriction of the ink 20 in the channel of jet 2 to increase the velocity of droplets sufficient to offset the mechanical crosstalk droplet velocity loss.

Figure 7:
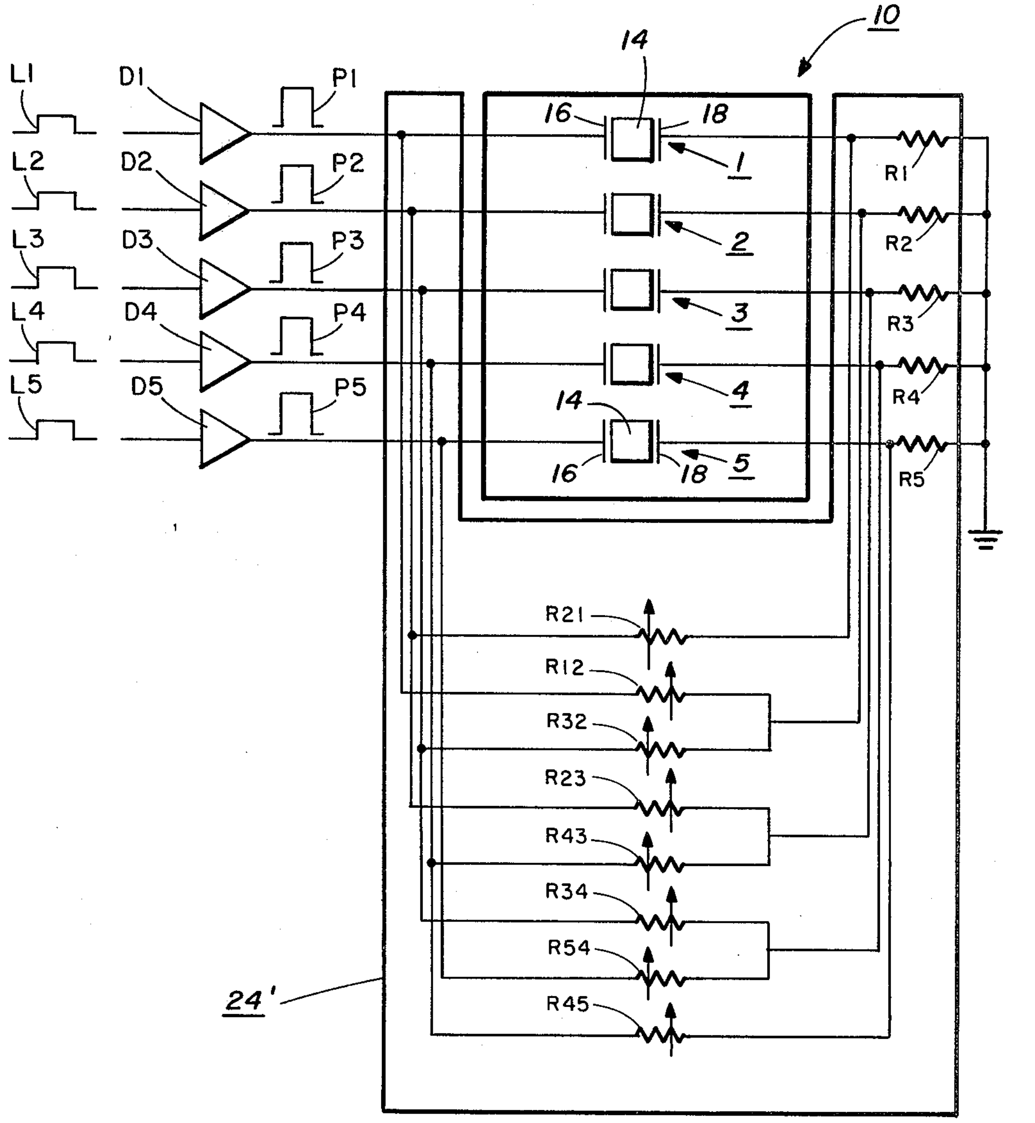
FIG. 7 shows a practical network configuration for eliminating crosstalk in an array in which only adjacent jets interfere with one another and produce positive mechanical crosstalk.

The discussion and the circuitry shown above regarding FIG. 3 through FIG. 6 was based on the general case of broad-based response; that is, it was assumed that any ejector 1–5, no matter how far removed in the array 10, if fired, can have an effect to some degree on any other jet in the array. In practice, however, results vary depending on array design. For example, the typical array represented in FIG. 7 is a positive crosstalk responding array wherein only adjacent jets affect each other. Accordingly, the circuitry in box 24' is only required to induce electrical crosstalk between adjacent ejectors. For example, assume ejectors 1 and 2 are fired together; the increase in mechanical energy applied to ejector 2 caused by mechanical crosstalk from ejector 1 is offset by electrically "leaking off" a certain amount of the drive pulse current through resistor R12 to electrode 18 on the transducer 14 of ejector 2, thus decreasing the potential difference between electrodes 16 and 18 applying less electrical energy to transducer 14 to offset the increased mechanical crosstalk energy impacting ink 20 in the channel of ejector 2. For further demonstration, assume that jets 1, 2 and 3 are fired together. To offset the mechanical interaction between the three jets, drive pulse 2 current is leaked through resistor R21 to offset the effect of jet-2-to-jet-1 mechanical crosstalk; drive pulse 3 current is leaked through resistor R32 to electrode 18 of jet 2 to offset jet-3-to-jet-2 mechanical crosstalk; drive pulse 1 current is leaked through resistor R12 to offset jet-1-to-jet-2 mechanical crosstalk; and more drive pulse 2 current is leaked, this time through resistor R23, to offset the jet-2-to-jet-3 mechanical crosstalk.

The values for all of the resistors in box 24' can be determined experimentally by operating the array, measuring drop velocity with and without adjacent jets firing and adjusting the resistors in the drive circuitry accordingly. Here, variable resistors are shown in box 24'. For large scale production of arrays, however, it would be more effective to use a simple resistance network chip. Since only a few variable elements are involved, the appropriate value for each could be determined quickly based on actual array performance measurements by an automated process. Each resistive element of the network chip could then be adjusted, for example, by laser trimming, by the same automated process. The chip thus made could then become a part of the array 10 package.

Although specific embodiments and components have been discussed herein, other embodiments or components could be utilized as desired. Such variations and modifications thereto are considered to be encompassed within the scope of the attached claims. For example, in connection with FIG. 6, for certain drivers D1–D5, the output impedance of the driver will provide sufficient series resistance to make the addition of resistors R1–R5 unnecessary. That is, the series resistors R1–R5 as shown in FIG. 6 may not be required if the output impedance of the driver itself is sufficient.

What is claimed is:

1. A method for reducing or eliminating mechanical crosstalk in a drop-on-demand droplet ejector array, which comprises:

providing an induced electrical crosstalk, which at least partly offsets the mechanical crosstalk.

2. The method of claim 1 wherein said electrical crosstalk is induced by provision of a passive electrical network connected to the drive circuitry of said array.

3. A circuit for compensating for positive mechanical crosstalk between adjacent channels of an ink jet array, each channel comprising an ink jet transducer coupled between an electrical driver and ground; the improvement comprising:

a series resistor connecting said transducer to ground and at least one compensating resistor per channel connected from the driver side of each transducer, and at least one of said compensating resistor being connected to the ground side of at least one adjacent transducer.

4. The circuit of claim 3 wherein said compensating resistors are variable resistors.

5. A method for compensating for positive crosstalk between adjacent channels of an ink jet array, where each channel comprises an ink jet transducer coupled between an electrical driver and ground, comprising the steps of:

connecting a resistor between ground and the ground side of each transducer and coupling a portion of the pulse at each driver output to the ground sides of said adjacent transducers.

6. A circuit for compensating for negative mechanical crosstalk between adjacent channels of an ink jet array, each channel comprising an ink jet transducer coupled between an electrical driver and ground; the improvement comprising:

a resistor in series with each transducer and its driver and one compensating resistor per channel connected at one end between the series resistor and transducer of a channel and connected at the opposite end between the series resistor and transducer of an adjacent channel.

7. The circuit of claim 6 wherein said compensating resistors are variable resistors.

8. A method for compensating for negative crosstalk between adjacent channels of an ink jet array, where each channel comprises an ink jet transducer coupled between an electrical driver and ground, comprising the steps of:

connecting a series resistor between the driver and the transducer of each channel and connecting a compensating resistor at one end between said series resistor and said transducer and at the other end between said series resistor and the transducer of at least one of said adjacent channels.

* * * * *